(12) United States Patent
Kumada (10) Patent No.: US 10,463,948 B2
(45) Date of Patent: Nov. 5, 2019

(54) SELF-PROPELLED SKATEBOARD

(71) Applicant: Kazumine Kumada, Charlotte, NC (US)

(72) Inventor: Kazumine Kumada, Charlotte, NC (US)

( * ) Notice: Subject to any disclaimer, the term of this patent is extended or adjusted under 35 U.S.C. 154(b) by 111 days.

(21) Appl. No.: 15/927,049

(22) Filed: Mar. 20, 2018

(65) Prior Publication Data

US 2018/0207511 A1 Jul. 26, 2018

Related U.S. Application Data

(63) Continuation-in-part of application No. 14/756,214, filed as application No. PCT/JP2013/057856 on Mar. 19, 2013, now abandoned.

(60) Provisional application No. 62/535,832, filed on Jul. 22, 2017, provisional application No. 62/473,513, filed on Mar. 20, 2017.

(51) Int. Cl.
| | |
|---|---|
| *A63C 17/12* | (2006.01) |
| *A63C 17/01* | (2006.01) |
| *A63C 17/00* | (2006.01) |
| *A63C 17/22* | (2006.01) |
| *B62M 1/24* | (2013.01) |

(52) U.S. Cl.
CPC .......... *A63C 17/12* (2013.01); *A63C 17/006* (2013.01); *A63C 17/014* (2013.01); *A63C 17/016* (2013.01); *A63C 17/223* (2013.01); *A63C 17/226* (2013.01); *B62M 1/24* (2013.01)

(58) Field of Classification Search
CPC ........ A63C 17/01; A63C 17/12; A63C 17/006
See application file for complete search history.

(56) References Cited

U.S. PATENT DOCUMENTS

| | | | | |
|---|---|---|---|---|
| 1,533,824 A | * | 4/1925 | Benjamin | B62K 3/002 280/221 |
| 1,679,819 A | * | 8/1928 | Fageol | B62K 3/002 280/229 |
| 2,086,471 A | * | 7/1937 | Chapman | B62K 3/002 280/229 |
| 2,125,568 A | * | 8/1938 | Huyssen | 280/229 |
| 3,086,795 A | * | 4/1963 | Hatcher | B62K 3/002 280/221 |

(Continued)

FOREIGN PATENT DOCUMENTS

| | | | |
|---|---|---|---|
| DE | 102007003659 A1 * | 7/2008 | A63C 17/01 |
| EP | 1118364 A2 * | 7/2001 | A63C 17/01 |

(Continued)

*Primary Examiner* — James A Shriver, II
*Assistant Examiner* — Steve Clemmons
(74) *Attorney, Agent, or Firm* — Tillman Wright, PLLC; James D. Wright; Tara Warwick (57) ABSTRACT

A self-propelled skateboard with at least one front wheel, a rear wheel, and a board, that is propelled without the rider's foot touching the ground. A driving force is generated the rider's weight is continuously shifted up and down in synchrony with the rocking motion of the eccentrically mounted rear wheel, which causes the board to be repeatedly pushed down and bounced back. Mounting multiple axles and one-way sprag clutch bearings on the rear wheel allows the rider to propel the board up inclined surfaces and to stop his/her motion and rest on the board, yet keep the skateboard continuously running.

12 Claims, 8 Drawing Sheets

(56) References Cited

U.S. PATENT DOCUMENTS

| | | | | |
|---|---|---|---|---|
| 3,647,241 | A * | 3/1972 | Huyssen | B62M 1/00 |
| | | | | 280/221 |
| 3,831,977 | A * | 8/1974 | Osborne | B62M 1/28 |
| | | | | 280/229 |
| 4,201,396 | A * | 5/1980 | Gessi | B62K 3/002 |
| | | | | 280/229 |
| 4,755,005 | A * | 7/1988 | Tsai | B60B 9/005 |
| | | | | 280/229 |
| 5,601,299 | A * | 2/1997 | Yun | A63C 17/004 |
| | | | | 280/11.223 |
| 6,398,237 | B1 * | 6/2002 | Attey | A63C 17/01 |
| | | | | 188/29 |
| 6,609,721 | B2 * | 8/2003 | Clift, Jr. | B62K 3/002 |
| | | | | 280/14.21 |
| 7,125,029 | B2 * | 10/2006 | Knox | B62K 3/002 |
| | | | | 280/229 |
| 7,959,235 | B2 * | 6/2011 | Kim | B60B 27/023 |
| | | | | 280/229 |
| 8,235,397 | B2 * | 8/2012 | Lee | B62K 25/02 |
| | | | | 280/1.191 |
| 2005/0285363 | A1 * | 12/2005 | Joung | A63C 17/262 |
| | | | | 280/87.041 |

FOREIGN PATENT DOCUMENTS

| | | | | |
|---|---|---|---|---|
| JP | 472403 | A * | 10/1972 | |
| JP | 4842146 | A * | 12/1973 | |
| JP | 2007044358 | A * | 2/2007 | |
| WO | WO-9301870 | A1 * | 2/1993 | A63C 17/01 |

* cited by examiner

SELF-PROPELLED SKATEBOARD

CROSS-REFERENCE TO RELATED APPLICATIONS

This application is a continuation-in-part of application Ser. No. 14/756,214, which is the National Stage of International Application No. PCT/JP2013/057856, filed Mar. 19, 2013, and claims the benefit of Provisional Application No. 62/473,513, filed Mar. 20, 2017, and Provisional Application No. 62/535,832, filed Jul. 22, 2017, the disclosures of which are incorporated herein by reference.

BACKGROUND OF THE INVENTION

The present invention is in the technical field of skateboards. More particularly, the present invention is in the technical field of self-propelled skateboards. More particularly, the present invention is in the technical field of self-propelled skateboards, which advance by a rider's own driving force without the necessity of the rider's foot touching the ground.

In a conventional skateboard in the said technical field, such as a skateboard with direction-caster, which is disclosed in U.S. Pat. No. 7,195,259, constructed with two boards joined by a bar and a wheel with a caster mounted on each board, a rider requires a motion that the skateboard be twisted back and forth. However, there is a problem with such a construction that it is difficult for the rider to propel the skateboard with a continuous strong driving force. Furthermore, the rider is not easily able to climb up an incline while on the board or stop his/her motion and rest on the board while having the skateboard continuously running.

BRIEF SUMMARY OF THE INVENTION

The present invention is a skateboard propelled by converting, rather than a rider's twisting motion, a rider's shifting motion of his/her weight up and down to a driving force, which is more spontaneous, continuous, stronger, and which allows the rider to actively propel the board up an incline, including a hill or ramp. The rider's motion is synchronized to the up and down motion of a board created by mounting an axle of the rear wheel eccentrically. Another embodiment of the present invention allows a rider to stop his/her motion and rest on the board while having the skateboard remain continuously running and also allows the rider to move the skateboard forward and yet climb up a hill by shifting the rider's weight forward repeatedly because of the back stop created by mounting multi axle and one-way sprag clutch bearings on a rear wheel.

DETAILED DESCRIPTION OF THE INVENTION

Figure 1:
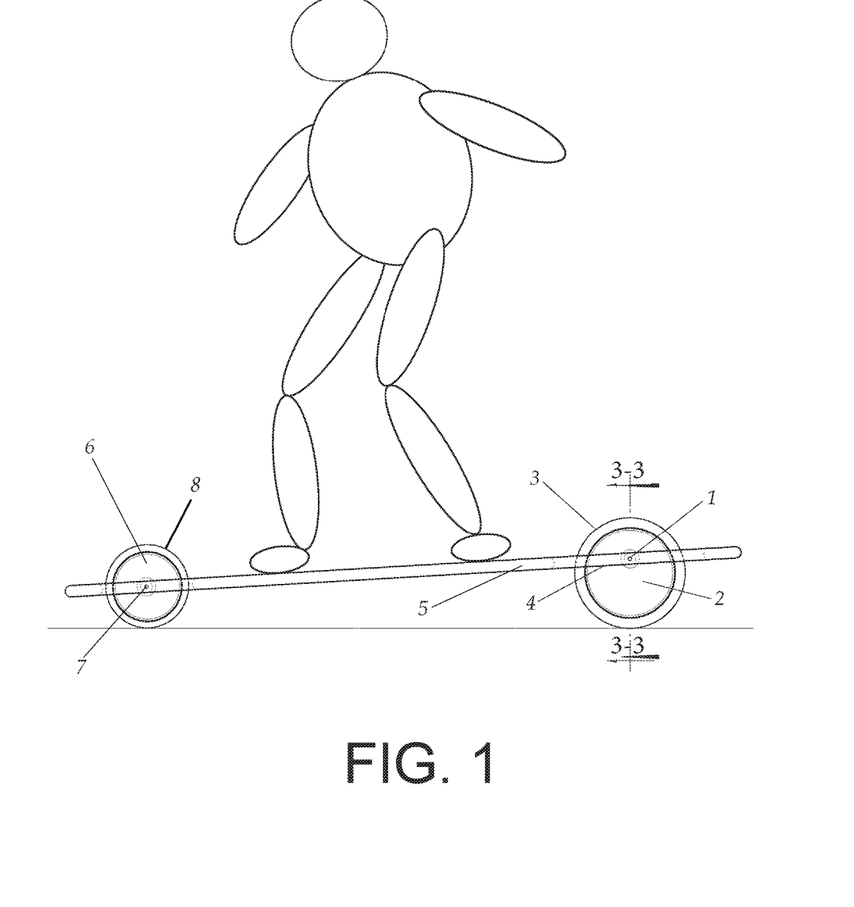
FIG. 1 is a side view of the skateboard's ascending position.

The present invention relates to a skateboard propelled without the necessity of the rider's foot touching the ground, by using a shifting of the rider's weight. While a rider keeps his/her balance on a board 4 of FIG. 1, showing a side view of the ascending position of the skateboard in the attached drawing, the rider's continuous shifting motion of his/her weight up and down by using a front to back rocking motion causes the board to be repeatedly pushed down and bounced back, thereby creating the driving force of the present invention and allowing the rider to propel the board forward. The rider synchronizes his/her up and down motion to the rocking motion of the eccentrically mounted rear wheel 2 of FIG. 2, showing a side view of the descending position of the skateboard in the attached drawing.

Figure 3:
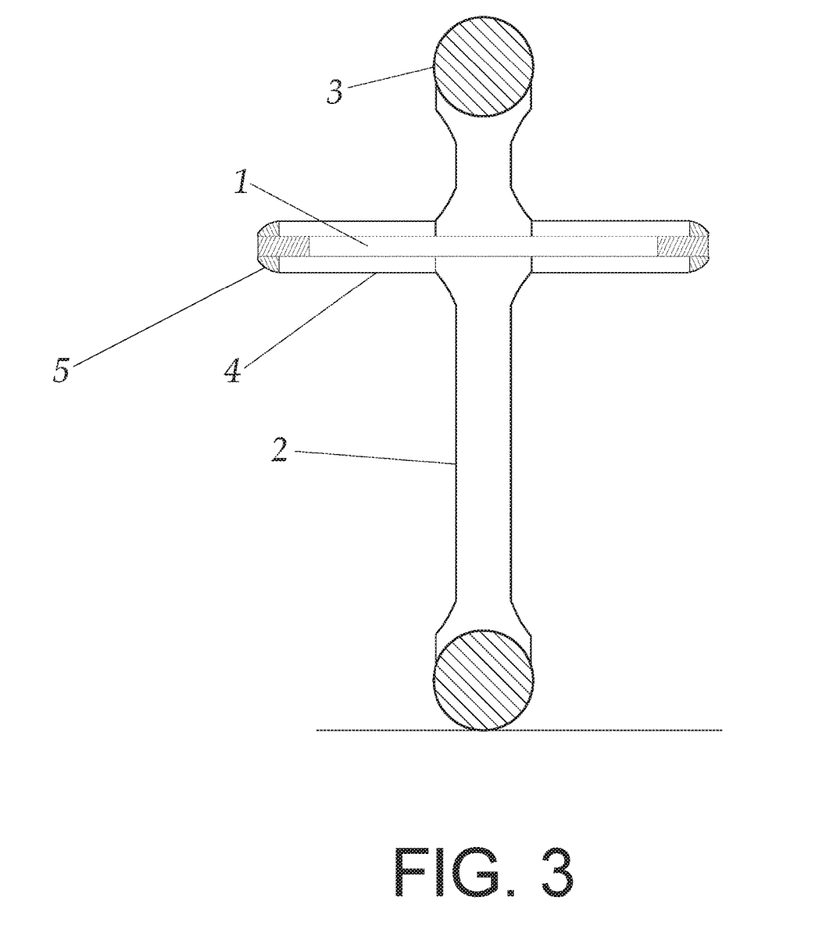
FIG. 3 is a vertical section on an enlarged scale, through the rear wheel 2 of the skateboard taken on the line 3-3 of FIG. 1.

FIG. 3 in the attached drawing is a vertical cross-section, on an enlarged scale, through the rear wheel 2 of the skateboard taken on the line 3-3 of FIG. 1. In this embodiment, a single axle 1 of the rear wheel 2 is mounted eccentrically.

In order to properly start the skateboard, motion should be initiated from where the axle 1 of the rear wheel 2 is set in a position farthest from the ground, as shown in FIG. 1, while the rider keeps his/her center of gravity slightly forward. The rider then strongly shifts his/her weight downward, so the axle 1 moves forward, accompanying the rear wheel 2 to turn. Subsequently, the axle 1 sets its position at the nearest from the ground as shown in FIG. 2. The rider then synchronizes his/her shifting weight movements to the turn of the wheel, which contiguously rebounds by its inertia force and sets the skateboard back to the position of FIG. 1. In this manner, the skateboard acquires its driving force, as the rider performs this exercise in succession.

Figure 2:
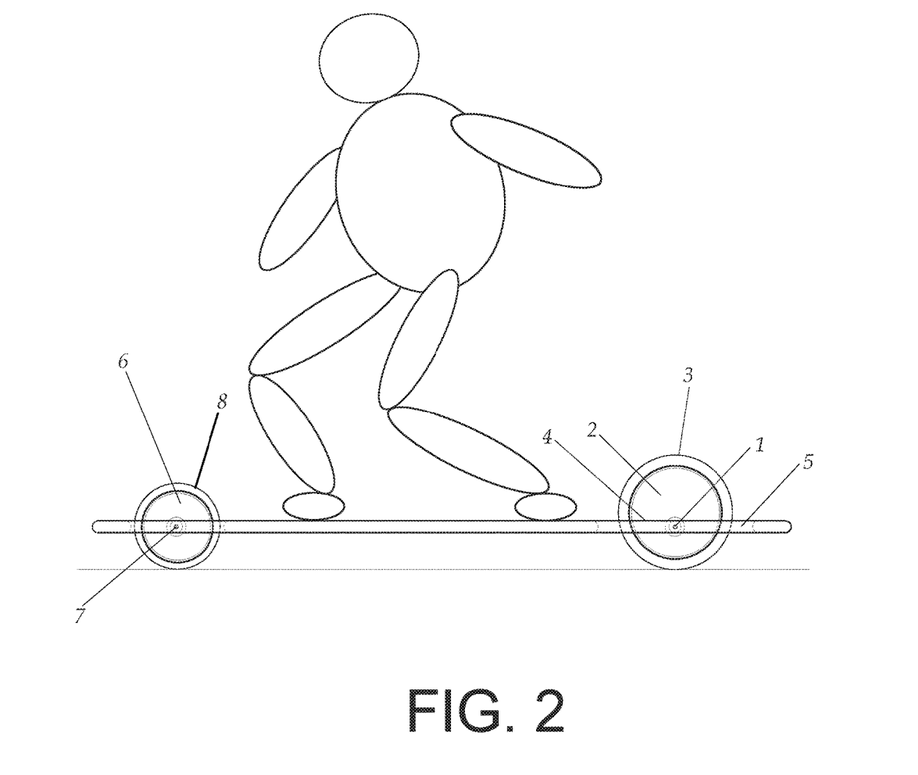
FIG. 2 is a side view of the skateboard's descending position.
Figure 4:
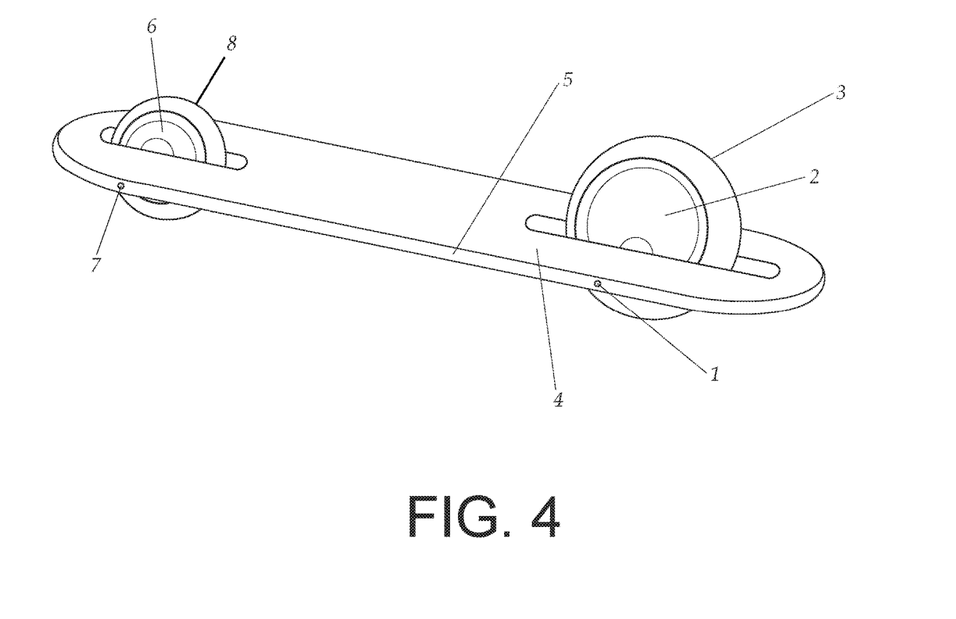
FIG. 4 is a perspective view of the skateboard.

An embodiment of the skateboard shown in FIGS. 1-4 combines a board 4 with front and rear cavities, a front wheel 6, and a rear wheel 2 as shown in FIG. 4, showing a perspective view of the skateboard in the attached drawing. A front wheel 6 is a normal wheel that an axle 7 runs through at the center of the wheel, while the rear wheel 2 has an axle 1 that runs through offset from the center as shown in FIG. 3. Each of the axle 7 of the front wheel 6 and the axle 1 of the rear wheel 2 is attached to the board 4 within the front cavity and the rear cavity of board 4, respectively. The diameter of the rear wheel 2 should be larger than the diameter of the front wheel 6, and can be made to allow the board 4 to become parallel to the ground when the axle 1 sets in the nearest position from the ground as shown in FIG. 2.

In addition, the larger the diameter of the rear wheel 2 is, the more momentum of the rider increases. A resilient material such as an elastic carbon can be used for the board 4 to not only allow the board to accommodate rugged ground surface, but also to allow the rider to run the skateboard more effectively by using the board's repulsive force. To protect the skateboard and the encountering objects, a bumper 5 can be applied to the edges of the board 4. Each wheel rim of both the front wheel 6 and the rear wheel 2 can be covered with a tire 8 and a tire 3, respectively. Additionally one or more foot restraints such as straps, bindings, bands, grips, cuffs, or similar means of restraints can be affixed to the board to secure the rider's foot/feet and to support the rise of the board.

As a result of the rider running, this skateboard spontaneously obtains a large momentum in a short time, thereby stimulating the rider's whole body system and allowing the rider to propel the board forward. This simple structure makes the present invention suitable not only for the purpose of amusement, but also for the practical purpose of use as exercise equipment.

Figure 5:
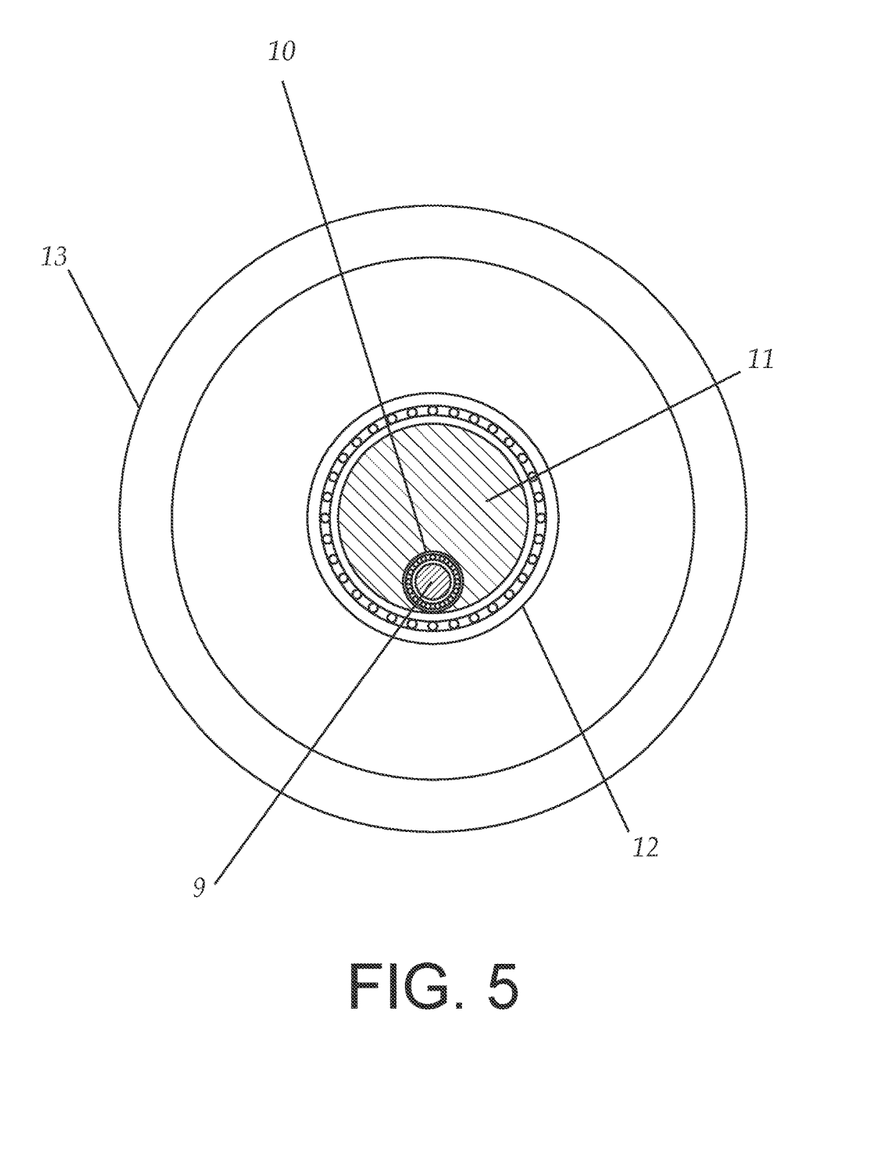
FIG. 5 is a side view of a skateboard's rear wheel 13 on an enlarged scale.
Figure 6:
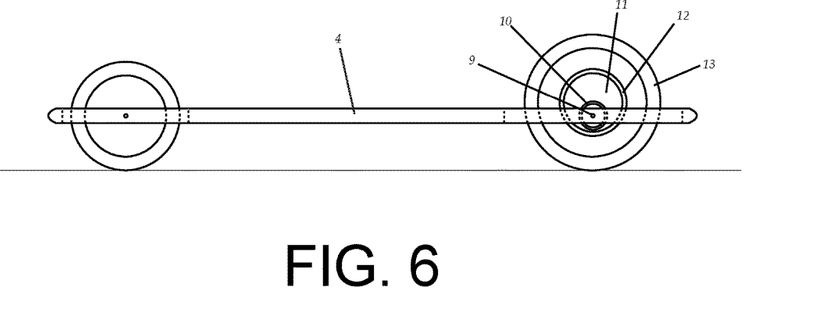
FIG. 6 is a side view of another embodiment of the skateboard in its descending position.
Figure 7:
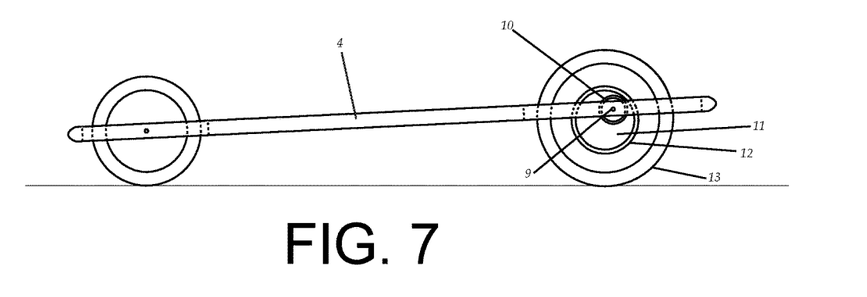
FIG. 7 is a side view of another embodiment of the skateboard in its ascending position with an eccentrically mounted axle of the rear wheel positioned slightly towards back.
Figure 8A:
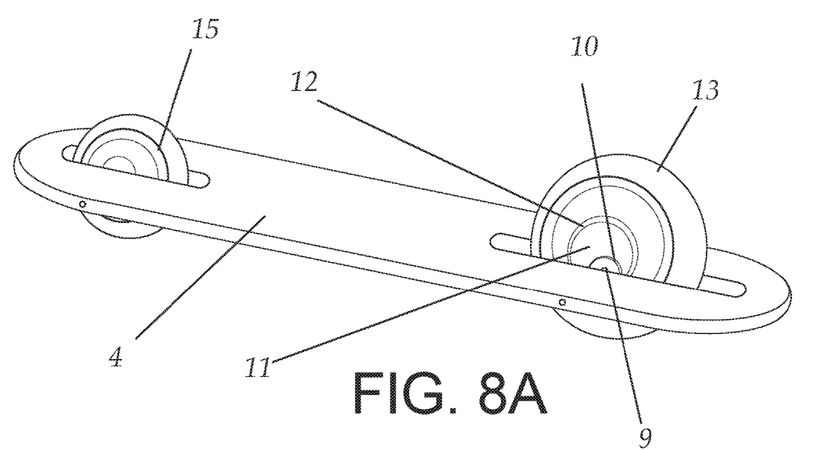
FIGS. 8A and 8B are perspective views of other embodiments of the skateboard.
Figure 8B:
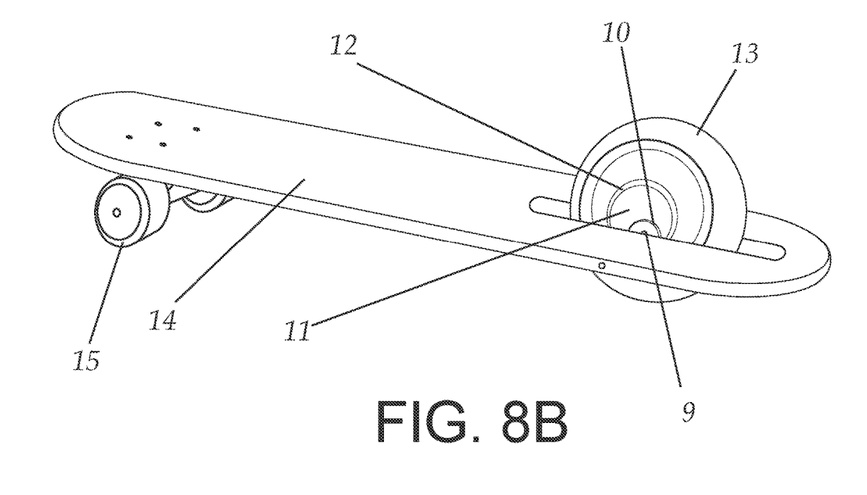

FIGS. 5-9 illustrate another embodiment of the present invention with a rear wheel 13 and a front wheel 15. The front wheel 15 can be a normal wheel with an axle that runs through the center of the wheel, as depicted in FIG. 8A, or it can be a conventional multi-wheel axle truck 16 produced in the current skateboard industry and mounted directly onto a board 14 rather than within a cavity, as shown in FIG. 8B. FIG. 5 in the attached drawing is a side view, on an enlarged scale, of the rear wheel 13. The rear wheel 13 has a primary axle 9. The primary axle 9 is eccentrically mounted with a one-way sprag clutch bearing 10 to the secondary axle 11. The secondary axle 11 is mounted in the center of the rear wheel 13 with a one-way sprag clutch bearing 12. When mounted, one-way sprag clutch bearings turn freely anti-clockwise with respect to the orientation of the skateboard as it is depicted in FIGS. 6-8.

Figure 9:
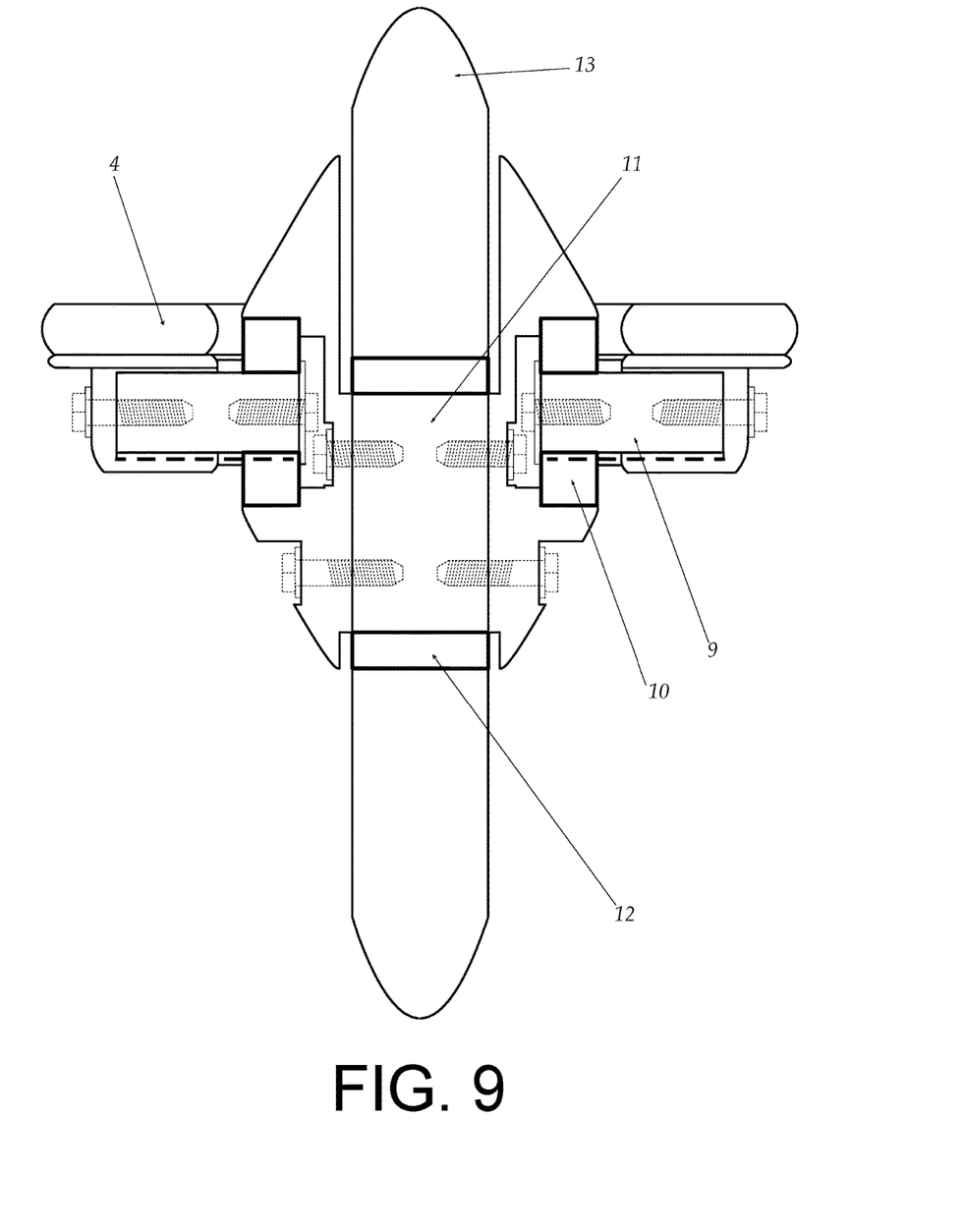
FIG. 9 is a back view of a cross-section of the rear wheel 13 with a one-way sprag clutch bearing 10 mounted outside of a one-way sprag clutch bearing 12.

The primary axle 9 can be mounted along the inside of the inner ring of the one-way sprag clutch bearing 12, as depicted in FIG. 5, or anywhere between the center of the rear wheel 13 and the inside of the inner ring of the one-way sprag clutch bearing 12. Additionally, the primary axle 9 with one-way sprag clutch bearing 10 can be mounted inside the one-way sprag clutch bearing 12 as shown in FIGS. 5-8, or the one-way sprag clutch bearing 10 can be mounted outside the one-way sprag clutch bearing 12, as depicted in FIG. 9, especially if the diameter of the one-way sprag clutch bearing 12 is too small to accept the one-way sprag clutch bearing 10 inside.

On FIG. 6 in the attached drawing, when the board 4 is in descending position and no further motion is taken by the rider, the one-way sprag clutch bearing 10 stops its motion, but the rear wheel 13 keeps turning, since the one-way sprag clutch bearing 12 is turning towards its free direction, so the skateboard keeps running.

On FIG. 7 in the attached drawing, when the board 4 is in ascending position and the primary axle 9 of the rear wheel positioned slightly towards back and no further motion is taken by the rider, the board 4 keeps its position since the clutch on the one-way sprag clutch bearing 10 is engaged while the rear wheel 13 keeps turning, since the one-way sprag clutch bearing 12 is turning towards its free direction, so the skateboard keeps running.

As a result of using the multi-axle embodiment, the rider is further enabled to propel the board up an incline while remaining on the board and to stop his/her motion and rest on the board while having the skateboard continuously running. The skateboard can also move forward and yet climb uphill by shifting rider's weight forward repeatedly because of the back stop clutch bearing.

The term "axle" as used herein indicates a single or split shaft around which an object or objects may rotate.

The term "board" as used herein applies in a functional sense, and indicates a generally elongated structural member of little thickness. The preferred embodiment includes a board formed from elastic carbon material. Other materials are available that would be suitable for use on their own or together with other materials for alternative embodiments of the present invention. Examples are wood, bamboo, metal, polymers, or composite materials such as carbon fiber, or fiberglass, or any other similar materials. Those in the art will understand that any suitable material, now known or hereafter developed, may be used in forming the boards described herein.

The invention claimed is:

1. A self-propelled skateboard comprising:
   a board having a front cavity and a rear cavity;
   a first wheel of fixed diameter;
   a front axle, wherein said front axle is centrally affixed to said first wheel;
   a second wheel of greater diameter than said first wheel;
   a tire covering each of said first wheel and said second wheel;
   a primary rear axle;
   a secondary rear axle;
   wherein said primary rear axle is eccentrically affixed to said secondary axle using at least one one-way sprag clutch bearing;
   wherein said secondary axle is centrally affixed to said second wheel using at least one one-way sprag clutch bearing;
   wherein said front axle is affixed to said board within said front cavity and said primary rear axle is affixed to said board within said rear cavity.

2. A self-propelled skateboard as in claim 1, further comprising at least one foot restraint affixed to said board to secure a rider's feet to said board.

3. A self-propelled skateboard as in claim 2, further comprising a bumper of protective material affixed to the outer edges of said board.

4. A self-propelled skateboard comprising:
   a board having a front end and a rear end, wherein a rear cavity is located in said rear end;
   a front multi-wheel axle truck;
   a rear wheel of greater diameter than wheels on said front multi-wheel axle truck;
   a tire covering said rear wheel;
   a primary rear axle;
   a secondary rear axle;
   wherein said primary rear axle is eccentrically affixed to said secondary axle using at least one one-way sprag clutch bearing;
   wherein said secondary axle is centrally affixed to said second wheel using at least one one-way sprag clutch bearing;
   wherein said front multi-wheel axle truck is affixed to front end of said board and said primary rear axle is affixed to said board within said rear cavity.

5. A self-propelled skateboard as in claim 4, further comprising at least one foot restraint affixed to said board to secure a rider's feet to said board.

6. A self-propelled skateboard as in claim 5, further comprising a bumper of protective material affixed to the outer edges of said board.

7. A self-propelled skateboard comprising:
   a board having a front cavity and a rear cavity;
   a first wheel of fixed diameter;
   a front axle, wherein said front axle is centrally affixed to said first wheel;
   a second wheel of greater diameter than said first wheel;
   a tire covering each of said first wheel and said second wheel;

a primary rear axle;

a secondary rear axle;

wherein said primary rear axle is eccentrically affixed to said secondary axle using at least one one-way sprag clutch bearing;

wherein said secondary axle is centrally affixed to said second wheel;

wherein said front axle is affixed to said board within said front cavity and said primary rear axle is affixed to said board within said rear cavity.

8. A self-propelled skateboard as in claim 7, further comprising at least one foot restraint affixed to said board to secure a rider's feet to said board.

9. A self-propelled skateboard as in claim 7, further comprising a bumper of protective material affixed to the outer edges of said board.

10. A self-propelled skateboard comprising:

a board having a front end and a rear end, wherein a rear cavity is located in said rear end;

a front multi-wheel axle truck;

a rear wheel of greater diameter than wheels on said front multi-wheel axle truck;

a tire covering said rear wheel;

a primary rear axle;

a secondary rear axle;

wherein said primary rear axle is eccentrically affixed to said secondary axle using at least one one-way sprag clutch bearing;

wherein said secondary axle is centrally affixed to said second wheel;

wherein said front multi-wheel axle truck is affixed to front end of said board and said primary rear axle is affixed to said board within said rear cavity.

11. A self-propelled skateboard as in claim 10, further comprising at least one foot restraint affixed to said board to secure a rider's feet to said board.

12. A self-propelled skateboard as in claim 10, further comprising a bumper of protective material affixed to the outer edges of said board.

* * * * *